United States Patent [19]

Christiansen

[11] Patent Number: 4,497,495
[45] Date of Patent: Feb. 5, 1985

[54] UNITIZED WHEEL BEARING SEAL WITH MULTIPLE LIPS

[75] Inventor: Paul J. Christiansen, Sandusky, Ohio

[73] Assignee: General Motors Corporation, Detroit, Mich.

[21] Appl. No.: 586,343

[22] Filed: Mar. 5, 1984

[51] Int. Cl.³ .......................... F16J 15/32; F16J 15/48
[52] U.S. Cl. ........................................ 277/50; 277/27; 277/82; 277/84; 277/152
[58] Field of Search .................... 277/84, 81 R, 50, 92, 277/95, 152, 153, 82, 166, 39, 27, 65

[56] References Cited

U.S. PATENT DOCUMENTS

| 2,240,252 | 4/1941 | Bernstein . | |
|---|---|---|---|
| 3,101,954 | 8/1963 | Huddle | 277/39 |
| 3,363,911 | 1/1968 | McKinnen | 277/153 X |
| 3,494,681 | 2/1970 | Anderson et al. | 277/82 X |
| 4,106,781 | 8/1978 | Benjamin et al. | 277/82 |
| 4,278,261 | 7/1981 | Miura et al. | 277/153 |
| 4,285,526 | 8/1981 | Klinteberg et al. | 277/153 |
| 4,408,809 | 10/1983 | Walter et al. | 277/92 X |

FOREIGN PATENT DOCUMENTS 2107024 4/1983 United Kingdom .

Primary Examiner—Robert S. Ward
Attorney, Agent, or Firm—Patrick M. Griffin

[57] ABSTRACT

A unitized wheel bearing seal includes inner and outer metal casings each of which has a cylindrical wall press fitted between inner and outer concentric bores in a wheel bearing to seal a lubricant space. The outer bore is stationary, and the inner metal casing has a radially extending outer annular flange. A two lip, unsprung seal extends from the inner casing, one leg engaging the annular flange and the other engaging the cylindrical wall of the outer casing, each at an acute angle, with a lubricant containing cavity formed between them. This orientation allows the lips to flex away to allow pressure egress from the lubricant space, but prevents flexing in the other direction to block the ingress of contaminants from the ambient. The spinning annular flange also acts as a slinger to prevent contaminant entry.

3 Claims, 2 Drawing Figures

UNITIZED WHEEL BEARING SEAL WITH MULTIPLE LIPS

This application relates to bearing seals and specifically to a unitized bearing seal of the unsprung type.

BACKGROUND OF THE INVENTION

Unitized seals are well known in the prior art and generally comprise radially inner and outer metal casings which are nested together and spaced radially from each other to create a generally annular sealing space therebetween. The casings do not touch, but a seal located between the casings seals the space. The unit may be separately handled and press fit between a shaft and bore or between the races of a radial bearing. Such seals generally include a garter spring type seal for wear take-up of the sealing lip. This can create excessive torque in a radial bearing of relatively large diameter such as may be found in a radial bearing large enough to fit over a CV joint. While unsprung unitized seals exist in the art, they are not well suited for the application desired. Such bearing applications, especially in automotive wheel bearings, involve high temperatures and pressures which it may be necessary to vent, as well as the necessity of excluding contaminants such as water and particulates.

The U.S. patent to Bernstein, U.S. Pat. No. 2,240,252, discloses an unsprung unitized oil seal interposed between a shaft and a bore. Oil seals are not, in general, particularly applicable to the very different task of a grease seal in the environment of a wheel bearing. The structure in Bernstein includes too many surfaces in rubbing contact to run with sufficiently low torque. The U.S. patent to Huddle, U.S. Pat. No. 3,101,954, discloses a structure suitable to heavy farm machinery and designed to allow heavy particulates to wedge between the casings to more tightly bias a sealing lag. Such a design would not be suitable in a higher speed automotive application, as the torque would be far too high. The UK Patent Application GB No. 2 107 024A discloses an unsprung unitized seal in an over CV application. However, the design appears to comprise a single casing which would rub between the bearing races as they rotated relative to one another to create an extremely high torque.

SUMMARY OF THE INVENTION

The present invention provides a unitized seal which overcomes the shortcomings of the prior art with a design suited to act as a low torque grease seal and particulate excluder in the environment of a high speed and high temperature wheel bearing.

The unitized assembly of the invention is adapted to be press fit between a pair of radial bearing races, an inner race which is rotatable with the outside of a CV joint housing and an outer race which is joined to the automotive suspension and thus not rotatable relative to the vehicle. The assembly includes a pair of stamped sheet metal unitary casings. A first casing includes a cylindrical wall press fittable within a bore in the outer bearing race with a circular edge at one end and an integral, radially inwardly extending annular wall at the other end. A second casing includes a cylindrical wall concentric with the first and press fittable within a bore in the inner race and an integral, radially outwardly extending annular wall disposed in the same plane as the circular edge of the first casing.

An unsprung elastomer seal bonded to the annular wall of the first casing includes a pair of integral lips. A first lip extends radially inwardly into sealing engagement with the second casing cylindrical wall at an acute angle. A second lip extends radially outwardly into sealing engagement with the second casing annular wall, also at an acute angle with respect thereto.

The assembly may be press fitted between the bearing races by a suitable tool with the first casing circular edge and the second casing annular wall maintained co-planar and registered with a suitable stop, such as the face of a bearing race, which will leave the annular wall exposed to the ambient and the sealing lips exposed to a lubricant reservoir of the bearing. The orientation of the lips allows them to flex away from their sealing surfaces under the force of pressurized lubricant from the reservoir, but they act as one way gates and will not flex back to allow contaminants entry.

Additional advantages are provided by the structure. The annular wall of the second casing acts as a rotating slinger to throw contaminants outwardly and away from the seal to help prevent their initial entry. Those contaminants which do enter can easily drain out of the annular space between the casings as the circular edge of the first casing provides no barrier to their egress. In addition, wear of the second seal lip on the annular wall of the second casing may be adjusted for by tapping the second casing slightly axially toward the first. The egress of lubricant past the lips will help prevent the wear process initially, also.

DESCRIPTION OF THE PREFERRED EMBODIMENT

Figure 1:
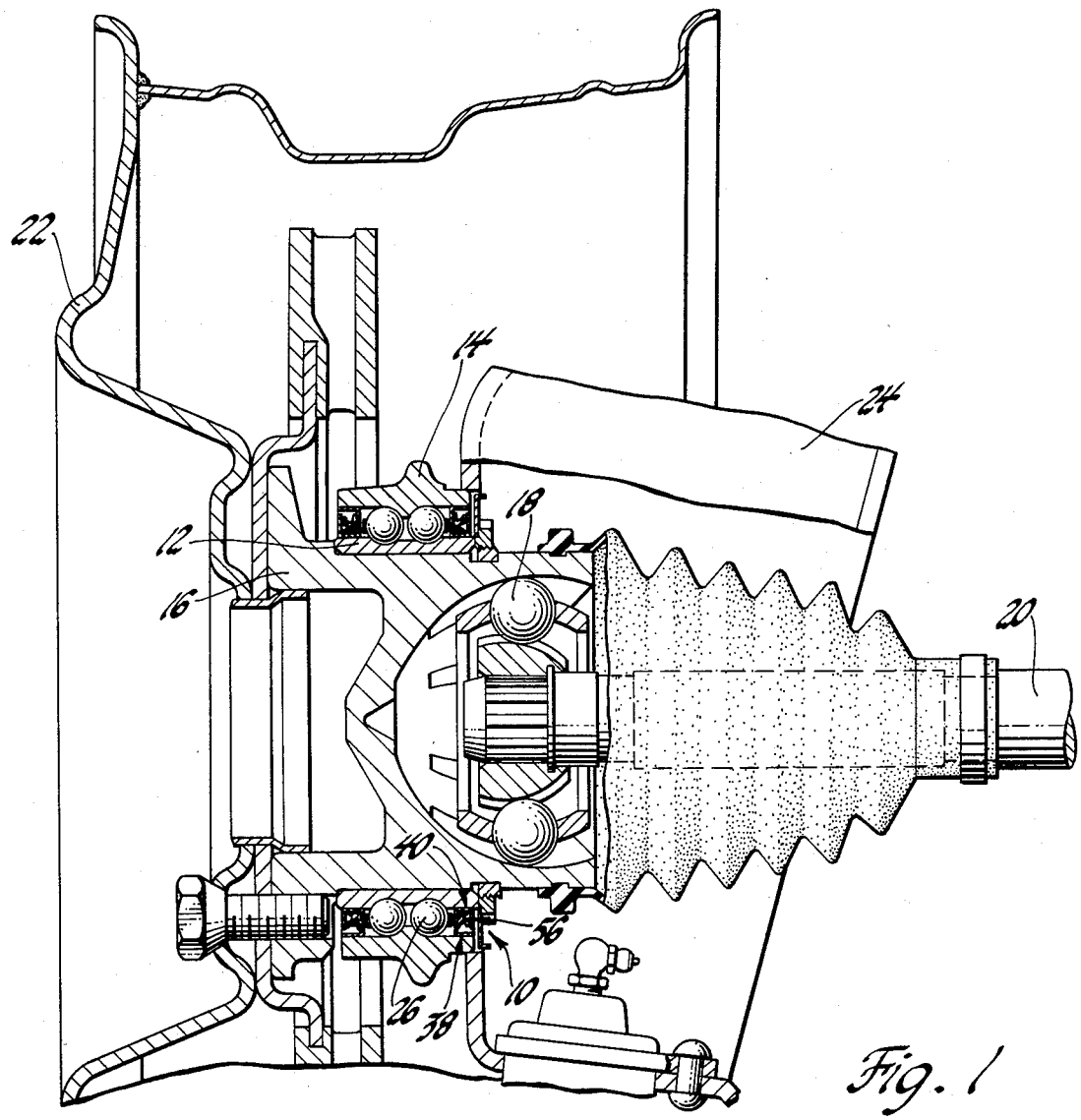
Figure 2:
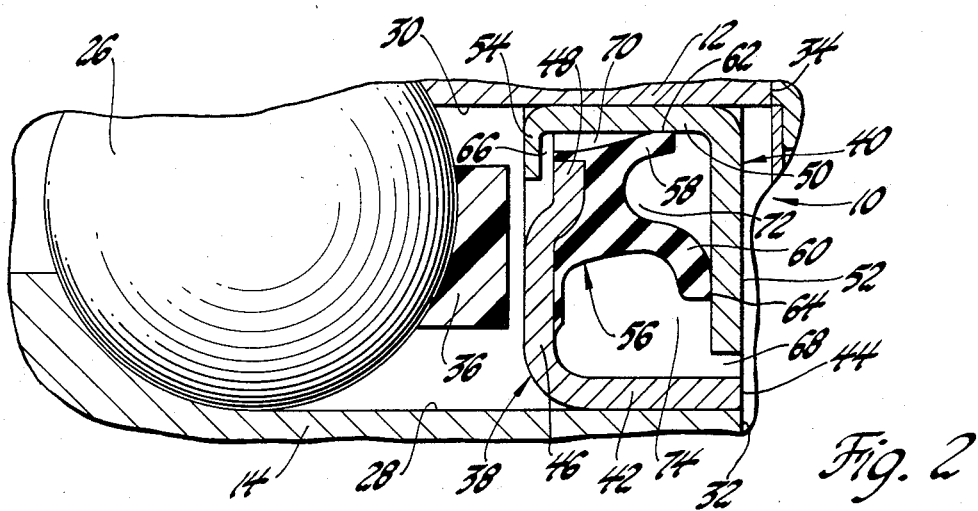

These and other objects and features of the invention will appear from the following written description and drawings in which:

FIG. 1 is a environmental view showing part of a vehicle suspension and drive shaft and wheel with the seal of the invention in place in a bearing, and FIG. 2 is an enlargement of a section of FIG. 1 showing the details of the seal of the invention.

Referring first to FIG. 1, the unitized seal of the assembly of the invention designated generally at 10 is shown press fit between inner 12 and outer 14 races of a radial bearing. Inner race 12 is affixed to the housing 16 of a conventional CV joint 18 which is in turn driven by drive shaft 20. Since CV joint 18 drives a wheel 22 and since outer race 14 is joined to a suspension 24, it is clear that inner race 12 rotates relative to nonrotatable outer race 14. It will be understood that in bearing designs of this type, known as over CV designs, the diameter of a ball complement 26 is relatively large, and consequently the seals will necessarily be of a large diameter as well. In a conventional garter spring seal, this could lead to excessive seal torque. Other potential problems with such a design are the high speed of operation in conjunction with the proximity to the disc brake in the CV joint, all of which could lead to high temperature of the lubricant reservoir around the ball complement 26. In addition, the ambient side of seal assembly 10 is exposed to particulates and contaminants such as water, which it is desirable and necessary to exclude.

Referring now to FIG. 2, one of the seal assemblies 10 of the invention is shown enlarged. Outer bearing race 14 and inner bearing race 12 have respective concentric cylindrical bores 28 and 30 therein which axially confine either side of ball complement 26 and which are adjacent to flat bearing faces 32 and 34 respectively. Ball complement 26 and a conventional ball cage 36 are surrounded by a reservoir of lubricant grease, not shown.

Sealing assembly 10 includes a pair of single piece or unitary stamped sheet metal casings, a first, outer casing 38 and a second, inner casing 40. Outer casing 38 includes a cylindrical wall 42 which has a planar circular edge 44 at one end and a radially inwardly extending, inner annular wall 46 at the other end which terminates in an inwardly crimped edge 48. Inner casing 40 also includes a cylindrical wall 50 with an outer, radially outwardly extending annular wall 52 at one end thereof and a rolled over edge 54 at the other end thereof. Casings 38 and 40 are nested together as shown and edge 54 is rolled over as a last step to maintain the two together.

Bonded to the inside of annular wall 46 is an elastomer seal designated generally at 56 which is unsprung and includes a first sealing lip 58 and second sealing lip 60. First lip 58 extends generally radially inwardly and axially outwardly or toward the inside of outer annular wall 52. Second lip 60 extends generally radially outwardly and axially outwardly toward the inside of outer annular wall 52. Lips 58 and 60 are generally straight in their disassembled configuration, and of a length such that, when casings 38 and 40 are assembled as described, the edge 62 of first lip 58 is brought into resilient sealing engagement with the inside of cylindrical wall 50 and the edge 64 of sealing lip 60 is brought into sealing engagement with the inside of outer annular wall 52. After this assembly, lips 58 and 60 are bent slightly in the orientation shown and each forms an acute angle with respect to the surface against which it seals. This orientation provides the benefits and features described below.

After casings 38 and 40 are nested and assembled together, the seal assembly 10 is press fit between bores 28 and 30 by any suitable tool which engages the outside of outer annular wall 52 and circular edge 44. These are thereby maintained in the same plane and assembly 10 is pressed inwardly until the tool engages a suitable stop member, which could be either face 32, 34 or both. This press fitting serves to define the axial spacing of crimped edge 48 from rolled edge 54, thereby defining a first annular gap 66. The force with which edge 64 of lip 60 is biased into the inside of outer annular wall 52 is also thereby determined. The radial spacing between bores 28 and 30 determines the radial spacing of the terminus of outer annular wall 52 from the inside of cylindrical wall 42, thereby defining a second annular gap 68. These gaps may be quite small, as long as there is no rubbing between casings 38 and 40. The orientation of lips 58 and 60 defines three cavities. The first cavity 70 opens to first gap 66 and thence to the lubricant around the ball complement 26. A second cavity 72 is formed between lips 58 and 60 and a third, or contaminant catching cavity 74 opens to second gap 68 and thence to the ambient. A grease fill may be put into the second cavity 72 before casings 38 and 40 are assembled, if desired.

This orientation and cooperation of lips 58 and 60 relative to the other elements of casings 38 and 40 provide several functions and benefits. Since outer casing 38 is stationary relative to the vehicle, there is not centrifugal action tending to throw lips 58 and 60 out of sealing engagement. In addition, any lubricant under pressure entering first cavity 70 may flex lip 58 radially outwardly away from cylindrical wall 50 to allow egress of the lubricant to the second cavity 72. Additional pressure can flex second lip 60 axially inwardly away from outer annular wall 52 to allow egress to third cavity 74 and finally to the ambient. Thus, lips 58 and 60 do not bind or increase in their bias upon their respective walls. The egress action of the lubricant helps to prevent the entry of contaminants from the ambient and edges 62 and 64 are kept lubricated as well. However, because of their orientation, lips 58 and 60 act as one way gates and cannot flex in the opposite direction so that particulates and contaminants cannot move in the other direction from the ambient. The shape of third cavity 74 allows easy exit to any water which may enter annular gap 68. The outside of lip 60 is bent so as to have no undercuts or pockets, and circular edge 44 provides no barrier to the draining of water. In addition, outer annular wall 52, since it rotates with inner casing 40, will act as a centrifugal slinger to throw contaminants and water away from annular gap 68. Furthermore, in the event of wear of edge 64, the entire casing 40 can be tapped axially inwardly by a suitable tool. This will not affect the sealing engagment of lip 58 but will increase the bias pressure of edge 64 against the inside of annular wall 52 and thus the sealing engagement therebetween.

Certain modifications of the design are easily made. The terminus of annular wall 52 could be flared outwardly to provide additional slinging action. As long as a portion of annular wall 52 is flat and co-planar with circular edge 44 the assembly 10 can be press fitted by a suitable tool. The angle and length of legs 58 and 60 may be easily changed to change the sealing pressures or bias involved and thus the sealing engagement with their respective walls, all within the same envelope and with the same size casings 38 and 40. It is to be understood that these modifications are within the scope of the invention which is not to be limited to the exact embodiment disclosed.

The embodiments of the invention in which an exclusive property or privilege is claimed are defined as follows:

1. A unitized wheel bearing seal assembly comprising,
   a unitary first sheet metal casing having a cylindrical wall adapted to be press fitted within a nonrotatable cylindrical bore,
   a unitary second sheet metal casing having a cylindrical wall concentric with the first casing cylindrical wall and adapted to be press fitted within a rotatable cylindrical bore concentric with the stationary bore, said second casing having an axially outer side wall adapted to be exposed to ambient and extending radially outwardly from its cylindrical wall,
   and a seal bonded to the first casing including first and second unsprung integral lips, the first lip extending into sealing engagement with the second casing cylindrical wall at an acute angle with respect thereto so as to be flexible radially outwardly away therefrom,
   said second lip extending into sealing engagement with the axially outer side wall at an acute angle with respect thereto so as to be flexible axially inwardly away from said side wall,
   said sealing lips further forming a lubricant cavity therebetween, the angle and flexibility of the lips acting as one way gates to allow ingress of lubricant to the cavity and egress of lubricant from said cavity to ambient while resisting the ingress of contaminants from the ambient to the cavity.

2. A unitized wheel bearing seal assembly comprising, a unitary first sheet metal casing having a cylindrical wall adapted to be press fitted within a nonrotatable cylindrical bore, a unitary second sheet metal casing having a cylindrical wall concentric with the first casing cylindrical wall and adapted to be press fitted within a rotatable cylindrical bore concentric with the stationary bore, said second casing further including an axially outer side wall adapted to be exposed to ambient and extending radially outwardly from its cylindrical wall toward the cylindrical wall of the first casing to create a minimal annular gap therefrom, and a seal bonded to the first casing including first and second unsprung integral lips, the first lip extending into sealing engagement with the second casing cylindrical wall at an acute angle with respect thereto so as to be flexible radially outwardly away therefrom, said second lips extending into sealing engagement with the axially outer side wall at an acute angle with respect thereto so as to be flexible axially inwardly away from said side wall, said second lip also cooperating with the second casing cylindrical wall to form a contaminant catching cavity opening to said annular gap, said sealing lips further forming a lubricant cavity therebetween, the angle and flexibility of the lips acting as one way gates to allow ingress of lubricant to the lubricant cavity and egress of lubricant from said cavity to ambient while resisting the ingress of contaminants from the ambient to said cavity, the rotating outer side wall and minimal annular gap cooperating to exclude contaminants from the contaminant catching cavity.

3. A unitized wheel bearing seal assembly comprising, a unitary first sheet metal casing having a cylindrical wall adapted to be press fitted within a nonrotatable cylindrical bore, a unitary second sheet metal casing having a cylindrical wall concentric with the first casing cylindrical wall and adapted to be press fitted within a rotatable cylindrical bore concentric with the stationary bore, said second casing further including an axially outer side wall adapted to be exposed to ambient and extending radially outwardly from its cylindrical wall toward the cylindrical wall of the first casing to create a minimal annular gap therefrom, and a seal bonded to the first casing including first and second unsprung integral lips, the first lip extending into sealing engagement with the second casing cylindrical wall at an acute angle with respect thereto so as to be flexible radially outwardly away therefrom, while having clearance from the axially outer side wall, said second lip extending into sealing engagement with the axially outer side wall at an acute angle with respect thereto so as to be flexible axially inwardly away from said side wall, said second lip also cooperating with the second casing cylindrical wall to form a contaminant catching cavity opening to said annular gap, said sealing lips further forming a lubricant cavity therebetween, the angle and flexibility of the lips acting as one way gates to allow ingress of lubricant to the lubricant cavity and egress of lubricant from said cavity to ambient while resisting the ingress of contaminants from the ambient to said cavity, the rotating outer side wall and minimal annular gap cooperating to exclude contaminants from the contaminant catching cavity, said annular gap and clearance of the first lip from the axially outer side wall allowing the second casing to be moved slightly axially inwardly to increase the sealing bias of the second sealing lip against the axially outer side wall to compensate for wear thereof.

* * * * *